(12) United States Patent
Cho et al.

(10) Patent No.: US 11,255,431 B2
(45) Date of Patent: Feb. 22, 2022

(54) ACTUATOR FOR SHIFT-BY-WIRE SYSTEM

(71) Applicants: Hyundai Motor Company, Seoul (KR); Kia Motors Corporation, Seoul (KR); Kyung Chang Industrial Co., Ltd., Daegu (KR)

(72) Inventors: Yang Rae Cho, Suwon-si (KR); Byoung Hyuk Lee, Suwon-si (KR); Wonjin Jeong, Hwaseong-si (KR); Kyu-Jung Kim, Daegu (KR); Ki Cheol Hyun, Daegu (KR); Dae Yeon Kim, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 56 days.

(21) Appl. No.: 16/890,426

(22) Filed: Jun. 2, 2020

(65) Prior Publication Data
US 2021/0180691 A1   Jun. 17, 2021

(30) Foreign Application Priority Data
Dec. 12, 2019   (KR) .......................... 10-2019-0165421

(51) Int. Cl.
*F16H 1/32* (2006.01)
*F16H 63/30* (2006.01)
(Continued)

(52) U.S. Cl.
CPC ............. *F16H 63/304* (2013.01); *F16H 1/32* (2013.01); *F16H 57/021* (2013.01);
(Continued)

(58) Field of Classification Search
CPC ...... F16H 63/304; F16H 57/0479; F16H 1/32; F16H 57/021; F16H 57/08; F16H 2057/085; F16H 2001/327; F16H 2061/323
See application file for complete search history.

(56) References Cited

U.S. PATENT DOCUMENTS 8,647,226 B2     2/2014  Kume et al.
9,856,943 B2 *   1/2018  Saito ..................... H02K 7/085
(Continued)

FOREIGN PATENT DOCUMENTS

CN    104565220 A  *  4/2015
CN    105932822 A  *  9/2016
(Continued)

*Primary Examiner* — Sherry L Estremsky
(74) *Attorney, Agent, or Firm* — Slater Matsil, LLP

(57) ABSTRACT

An acuator for a shift-by-wire system includes a drive motor installed inside a motor housing, the drive motor having a drive shaft, and a decelerator inside a decelerator housing coupled with the motor housing, the decelerator coupled to the drive shaft. The decelerator includes a sun gear connected to a first side of an eccentric part of the drive shaft, a ring gear engaged with the sun gear and fixed to the decelerator housing, an output shaft connected to a second side of the eccentric part, a first bearing coupled to one side of the eccentric part and supporting the sun gear, a second bearing coupled to the other side of the eccentric part and supporting the output shaft, and a power delivery unit coupled to the sun gear and the output shaft in a center region between the first and second bearings.

20 Claims, 9 Drawing Sheets

(51) Int. Cl.
*F16H 57/04* (2010.01)
*F16H 57/021* (2012.01)
*F16H 57/08* (2006.01)
*F16H 61/32* (2006.01)

(52) U.S. Cl.
CPC ......... *F16H 57/0479* (2013.01); *F16H 57/08* (2013.01); *F16H 2001/327* (2013.01); *F16H 2057/085* (2013.01); *F16H 2061/323* (2013.01)

(56) References Cited

U.S. PATENT DOCUMENTS

| | | | |
|---|---|---|---|
| 10,760,649 B2* | 9/2020 | Liu | F16H 1/32 |
| 2009/0189468 A1* | 7/2009 | Kume | H02K 1/148 |
| | | | 310/83 |
| 2020/0088267 A1* | 3/2020 | Shirai | H02K 7/083 |
| 2020/0217398 A1* | 7/2020 | Saito | F16H 57/0486 |
| 2021/0031828 A1* | 2/2021 | Hyun | B62D 6/008 |
| 2021/0088134 A1* | 3/2021 | Kim | F16H 1/32 |

FOREIGN PATENT DOCUMENTS

| | | | | |
|---|---|---|---|---|
| CN | 106286763 A | * | 1/2017 | |
| CN | 111828616 A | * | 10/2020 | F16H 61/32 |

* cited by examiner

ACTUATOR FOR SHIFT-BY-WIRE SYSTEM

CROSS-REFERENCE TO RELATED APPLICATIONS

This application claims priority to Korean Patent Application No. 10-2019-0165421, filed in the Korean Intellectual Property Office on Dec. 12, 2019, which application is hereby incorporated herein by reference.

TECHNICAL FIELD

The present invention relates to a shift-by-wire (SBW) system.

BACKGROUND

In general, an electronic transmission (shift-by-wire, SBW) system (hereinafter, referred to as an SBW system for convenience) implements shift control of the transmission by an electrical signal.

In the SBW system, a shift range operation signal generated by a shift operation apparatus is converted into an electrical signal and transmitted to a transmission control unit (TCU). The TCU drives an actuator according to the driver's shift willingness to shift the transmission according to the shift range.

In the SBW system, an actuator includes a sun gear eccentrically coupled to a drive shaft rotating by a drive motor, a fixed ring gear that may be engaged with the sun gear, and an output shaft coupled to the sun gear.

The actuator transmits the driving torque to the sun gear coupled to the eccentric portion of the drive shaft when the drive shaft rotates while the drive motor is driven. As a result, the sun gear oscillates with respect to the fixed ring gear and transmits the torque to the output shaft through the sun gear.

Here, when the drive shaft rotates once, the sun gear is decelerated and rotated by the number of teeth with the ring gear, the rotation speed is decreased by a deceleration ratio, and the output torque is increased by the deceleration ratio and transmitted to the output shaft.

In a conventional actuator for the SBW system, the power delivery portions of the sun gear and the output shaft are disposed in the sun gear side bearing region or the output shaft side bearing region.

For this reason, in the related art, during the deceleration and rotation of the output shaft through the sun gear, a radial direction load may be concentrated on each bearing. In addition, conventionally, when a normal direction load is concentrated in one bearing, it may cause an increase in the combined load (a radial direction load and an axial direction load) for one bearing.

The above information disclosed in this Background section is only for enhancement of understanding of the background of the invention and therefore it may contain information that does not form the prior art that is already known to a person of ordinary skill in the art.

SUMMARY

The present invention relates to a shift-by-wire (SBW) system. Particular embodiments relate to an actuator for a SBW system driven by a shift range operation signal in the SBW system.

Exemplary embodiments of the present invention provide an actuator for a shift-by-wire system that may equally distribute the radial load burden for bearings supporting a sun gear and an output shaft, minimize a burden of the combined load for the bearings, and improve transmission efficiency of the output torque.

An actuator for a shift-by-wire system according to an exemplary embodiment of the present invention includes a drive motor having a drive shaft and installed inside a motor housing and a decelerator eccentrically coupled to the drive shaft inside a decelerator housing coupled with the motor housing, wherein the decelerator includes a sun gear rotatably connected to an eccentric part at one side of the drive shaft, a ring gear engaged with the sun gear and fixed to the decelerator housing, an output shaft rotatably connected to the other side of the eccentric part, a first bearing coupled to one side of the eccentric part and supporting the sun gear, and a second bearing coupled to the other side of the eccentric part and supporting the output shaft, and further includes a power delivery unit provided to be mutually coupled to the sun gear and the output shaft in a center region between first and second bearings.

Also, in the actuator for the shift-by-wire system according to an exemplary embodiment of the present invention, the power delivery unit may include radial groove parts radially formed along a radial direction at an edge part of one surface of the sun gear corresponding to the output shaft, and radial protrusions formed to be protruded along a radial direction at the edge part of the output shaft and coupled to the radial groove parts with a predetermined gap.

Also, in the actuator for the shift-by-wire system according to an exemplary embodiment of the present invention, the radial groove parts and radial protrusions may be disposed to be mutually overlapped in the center region between the first and second bearings.

Also, in the actuator for the shift-by-wire system according to an exemplary embodiment of the present invention, the power delivery unit may further include crown parts formed radially along a radial direction between the radial groove parts of the sun gear.

Also, in the actuator for the shift-by-wire system according to an exemplary embodiment of the present invention, the crown part may form an arc surface of a predetermined curvature at a part in contact with the radial protrusion in the radial groove.

Also, in the actuator for the shift-by-wire system according to an exemplary embodiment of the present invention, the radial protrusion may be in contact in a normal direction to the arc surface along a rotating direction of the output shaft.

Also, in the actuator for the shift-by-wire system according to an exemplary embodiment of the present invention, the radial groove and the radial protrusion may transmit a rotation torque of a normal direction to the output shaft through the sun gear in the center region between the first and second bearings.

Also, in the actuator for the shift-by-wire system according to an exemplary embodiment of the present invention, the output shaft may integrally form a flange part orthogonal to a shaft direction.

Also, in the actuator for the shift-by-wire system according to an exemplary embodiment of the present invention, the flange part may integrally form the radial protrusions.

Also, in the actuator for the shift-by-wire system according to an exemplary embodiment of the present invention, the sun gear may further include a supporting part connected to the radial groove parts and supporting a flange part of the output shaft.

Also, in the actuator for the shift-by-wire system according to an exemplary embodiment of the present invention, a lubricant filled part filled with a lubricant may be provided between the flange part and the supporting groove part.

Also, in the actuator for the shift-by-wire system according to an exemplary embodiment of the present invention, the sun gear may include crown parts formed between the radial groove parts.

Also, in the actuator for the shift-by-wire system according to an exemplary embodiment of the present invention, a lubricant flow groove connected with the lubricant filled part may be formed in the crown part.

Also, in the actuator for the shift-by-wire system according to an exemplary embodiment of the present invention, the output shaft further may include a cover part integrally connected with the flange part and the radial protrusion.

Also, an actuator for a shift-by-wire system according to an exemplary embodiment of the present invention includes a drive motor having a drive shaft and installed inside a motor housing and a decelerator eccentrically coupled to the drive shaft inside a decelerator housing coupled with the motor housing, wherein the decelerator includes a sun gear rotatably connected to an eccentric part at one side of the drive shaft, a ring gear engaged with the sun gear and fixed to the decelerator housing, and an output shaft rotatably connected to the other side of the eccentric part, and further includes radial groove parts radially formed along a radial direction at an edge part of one side surface of the sun gear corresponding to the output shaft and radial protrusions formed to be protruded along a radial direction at an edge part of the output shaft and coupled to the radial groove parts with a predetermined gap.

Also, in the actuator for the shift-by-wire system according to an exemplary embodiment of the present invention, the radial groove parts and the radial protrusions may be provided to be in contact along the rotating direction of the output shaft in a normal direction.

Also, in the actuator for the shift-by-wire system according to an exemplary embodiment of the present invention, the sun gear may further include crown parts radially formed along a radial direction between the radial groove parts of the sun gear.

Also, in the actuator for the shift-by-wire system according to an exemplary embodiment of the present invention, the radial groove may form a first circular arc C1 of a predetermined curvature extending from an inner wall to the end side of the crown part.

Also, in the actuator for the shift-by-wire system according to an exemplary embodiment of the present invention, the crown part may form a second circular arc C2 of a predetermined curvature from the end side toward an edge end side of the sun gear.

Also, in the actuator for the shift-by-wire system according to an exemplary embodiment of the present invention, the crown part may form an arc surface in which the first circular arc C1 and the second circular arc C2 meet each other.

Also, in the actuator for the shift-by-wire system according to an exemplary embodiment of the present invention, the radial protrusion may be in contact with the arc surface in a normal direction along the rotating direction of the output shaft.

Exemplary embodiments of the present invention may evenly distribute the radial direction load acting on the bearings and may minimize the occurrence of complex loads on the bearings, thereby increasing the fatigue life of the bearings and further improving the delivery efficiency of the output torque.

Further, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The drawings are provided for reference in describing exemplary embodiments of the present invention, and the spirit of the present invention should not be construed only by the accompanying drawings.

DETAILED DESCRIPTION OF ILLUSTRATIVE EMBODIMENTS

Figure 1:
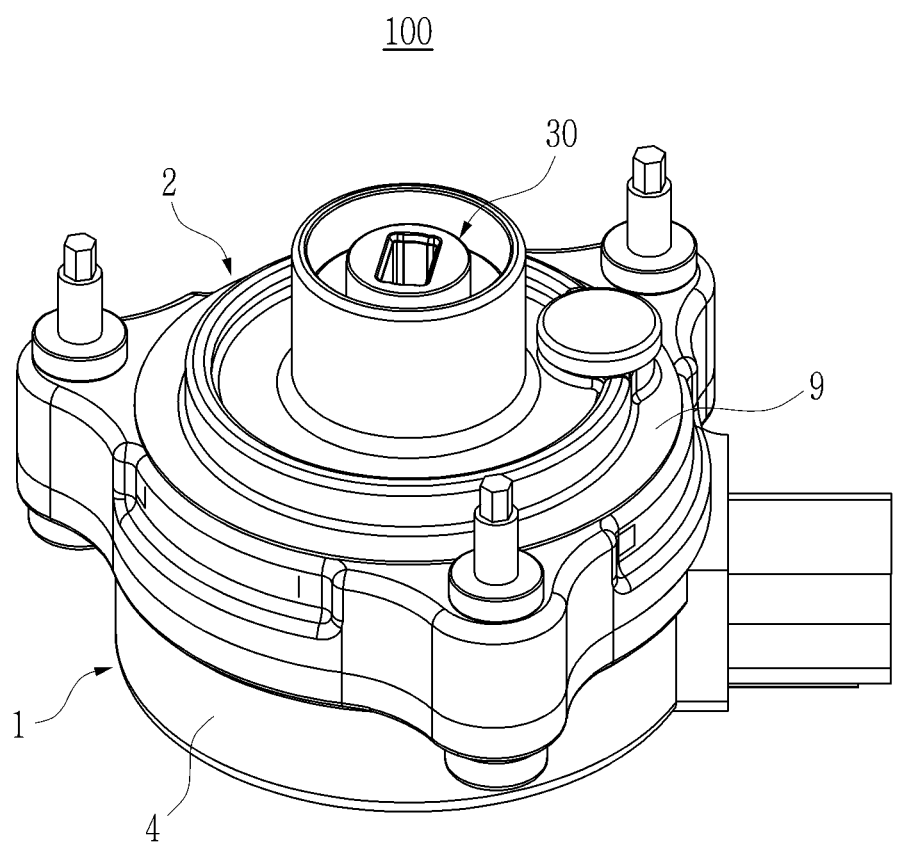
FIG. 1 is a perspective view showing an actuator for a shift-by-wire system according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Portions having no relation with the description will be omitted in order to explicitly explain the present invention, and the same reference numerals will be used for the same or similar elements throughout the specification.

In the drawings, size and thickness of each element are approximately shown for better understanding and ease of description. Therefore, the embodiments of the present invention are not limited to the drawings, and the thicknesses of layers, films, panels, regions, etc., are exaggerated for clarity.

Further, in the following detailed description, names of constituents, which are in the same relationship, are divided into "the first", "the second", and the like, but the embodiments of the present invention are not necessarily limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Figure 2:
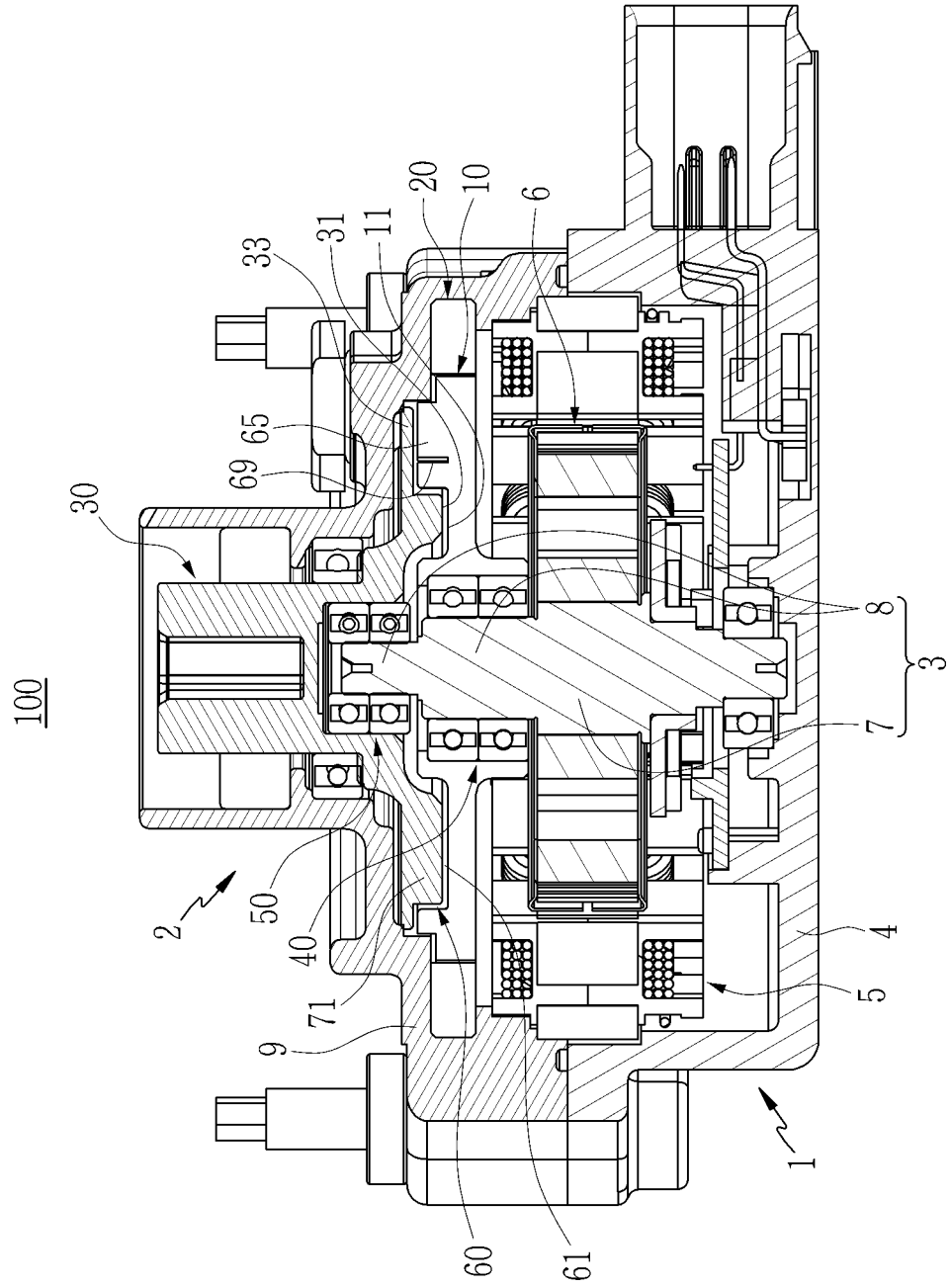
FIG. 2 is a cross-section schematic diagram showing an actuator for a shift-by-wire system according to an exemplary embodiment of the present invention.

FIG. 1 is a perspective view showing an actuator for a shift-by-wire system according to an exemplary embodiment of the present invention, and FIG. 2 is a cross-section schematic diagram showing an actuator for a shift-by-wire system according to an exemplary embodiment of the present invention.

Referring to FIG. 1 and FIG. 2, an actuator 100 for a shift-by-wire system according to an exemplary embodiment of the present invention may be applied to a shift-by-wire (SBW) system (hereinafter, referred to as an SBW system for convenience) as an electronic transmission.

The SBW system may more easily convert shift ranges D, R, N, and P (drive, reverse, neutral, and park) of a transmission by transmitting a shift intention of a driver through a shift lever operation to a shift controller as an electrical signal.

The actuator 100 for a SBW system according to an exemplary embodiment of the present invention may be driven by receiving a shift range conversion signal in the SBW system and performing shifting of an automatic transmission.

Hereinafter, the power delivery direction of the actuator wo is defined as a shaft direction and a radial direction orthogonal to the shaft direction, with respect to the drawing, a portion (an upper portion, an upper end, an upper surface, and an upper end portion) toward the upper side is defined as a front end/a front end portion, and a portion (a lower portion, a lower end, a lower surface, and a lower end portion) toward the lower side is defined as a rear end/a rear end portion.

However, the definition of the direction as described above may have a relative meaning depending on the reference position of the actuator wo and the like, and the reference direction is not necessarily limited to the reference direction of the embodiments of the present invention.

Further, an end (one side/one side end, the other side/the other side end, a front end, or a rear end) in the following may be defined as a predetermined portion (one side end portion, the other side end portion, a front end, or a rear end) including an end.

The actuator 100 according to the exemplary embodiment of the present invention in the SBW system is to decelerate the high speed rotation of the drive body to a low speed rotation to be outputted, and the output side thereof is connected to a manual shaft for adjusting the shifting mode of the transmission.

The actuator 100 for the shift-by-wire system according to an exemplary embodiment of the present invention basically includes a drive motor 1 as a driving body (commonly referred to as a motor unit in the art) and a decelerator 2 connected to the drive motor 1.

The drive motor 1 has a drive shaft 3 and is installed inside a motor housing 4. The drive motor 1 includes a stator 5 fixedly installed inside the motor housing 4, and a rotor 6 rotated through the drive shaft 3 with a predetermined gap inside the stator 5.

Since the drive motor 1 is composed of a configuration of an electric power-type drive motor according to a known technique that is well known in the art, more detailed description of the configuration is omitted herein.

Here, the drive shaft 3 includes a driving part 7 fixed to the rotor 6, and an eccentric part 8 eccentrically connected to the driving part 7 according to the shaft direction. The eccentric part 8 is integrally connected to the driving part 7 at the position off the shaft center of the driving part 7.

The decelerator 2 is provided with a motor-integrated reducer for decelerating the rotational speed transmitted from the drive motor 1 at a predetermined speed to be outputted. The decelerator 2 is installed inside a decelerator housing 9 which is coupled to the motor housing 4. The decelerator 2 is connected to the eccentric part 8 of the drive shaft 3 inside the decelerator housing 9.

The decelerator housing 9 may also include accessory elements such as brackets, ribs, blocks, plates, and the like for supporting various components which are described further below.

The actuator 100 for the shift-by-wire system according to an exemplary embodiment of the present invention is formed of a structure increasing a fatigue lifespan of bearings supporting rotary bodies of the decelerator 2 and improving delivery efficiency of the output torque.

For this, in the actuator 100 for the shift-by-wire system according to an exemplary embodiment of the present invention, the above-described decelerator 2 includes a sun gear 10, a ring gear 20, an output shaft 30, a first bearing 40, a second bearing 50, and a power delivery unit 60.

The sun gear 10 is a disc gear having outer teeth on an outer circumferential surface thereof, and is rotatably connected to one side of the eccentric part 8 of the drive shaft 3. Here, one side surface of the sun gear 10 is located on a side of the drive motor 1, and the other side surface of the sun gear 10 is located on the opposite side of the drive motor 1.

The ring gear 20 is fixedly installed inside the decelerator housing 9. The ring gear 20 has internal teeth formed on an inner circumferential surface thereof. The internal teeth engage with the external teeth of the sun gear 10 inside the ring gear 20. Here, there are more internal teeth of the ring gear 20 than there are external teeth of the sun gear 10.

The output shaft 30 is a shaft unit that outputs the finally reduced torque through the sun gear 10 and the ring gear 20, and is rotatably connected to the other side of the eccentric part 8. The output shaft 30 is disposed on the surface side of the other side of the sun gear 10.

The first bearing 40 is provided as a radial bearing and is coupled to one side of the eccentric part 8. The first bearing 40 is connected to the center side of the sun gear 10 and supports the rotation of the sun gear 10.

The second bearing 50 is provided as a radial bearing and is coupled to the other side of the eccentric part 8 at a predetermined distance from the first bearing 40 along the shaft direction. The second bearing 50 is connected to the center side of the output shaft 30 and supports the rotation of the output shaft 30.

Here, with the rotation of the drive shaft 3 according to the drive of the drive motor 1, the sun gear 10 rotates eccentrically inside the ring gear 20 through the eccentric part 8. In addition, the sun gear 10 engages with the internal teeth of the ring gear 20 through the external teeth, and revolves inside the ring gear 20 while rotating in a direction opposite to the rotational direction of the drive shaft 3 along the internal teeth. Accordingly, the sun gear 10 transmits the torque, which is a rotating component decelerated by a reverse rotation, to the output shaft 30 through the power delivery unit 60 below while performing a cycloidal deceleration movement.

In the exemplary embodiment of the present invention, the power delivery unit 60 is for transmitting the torque decelerated by the cycloidal deceleration movement of the sun gear 10 to the output shaft 30.

Figure 3:
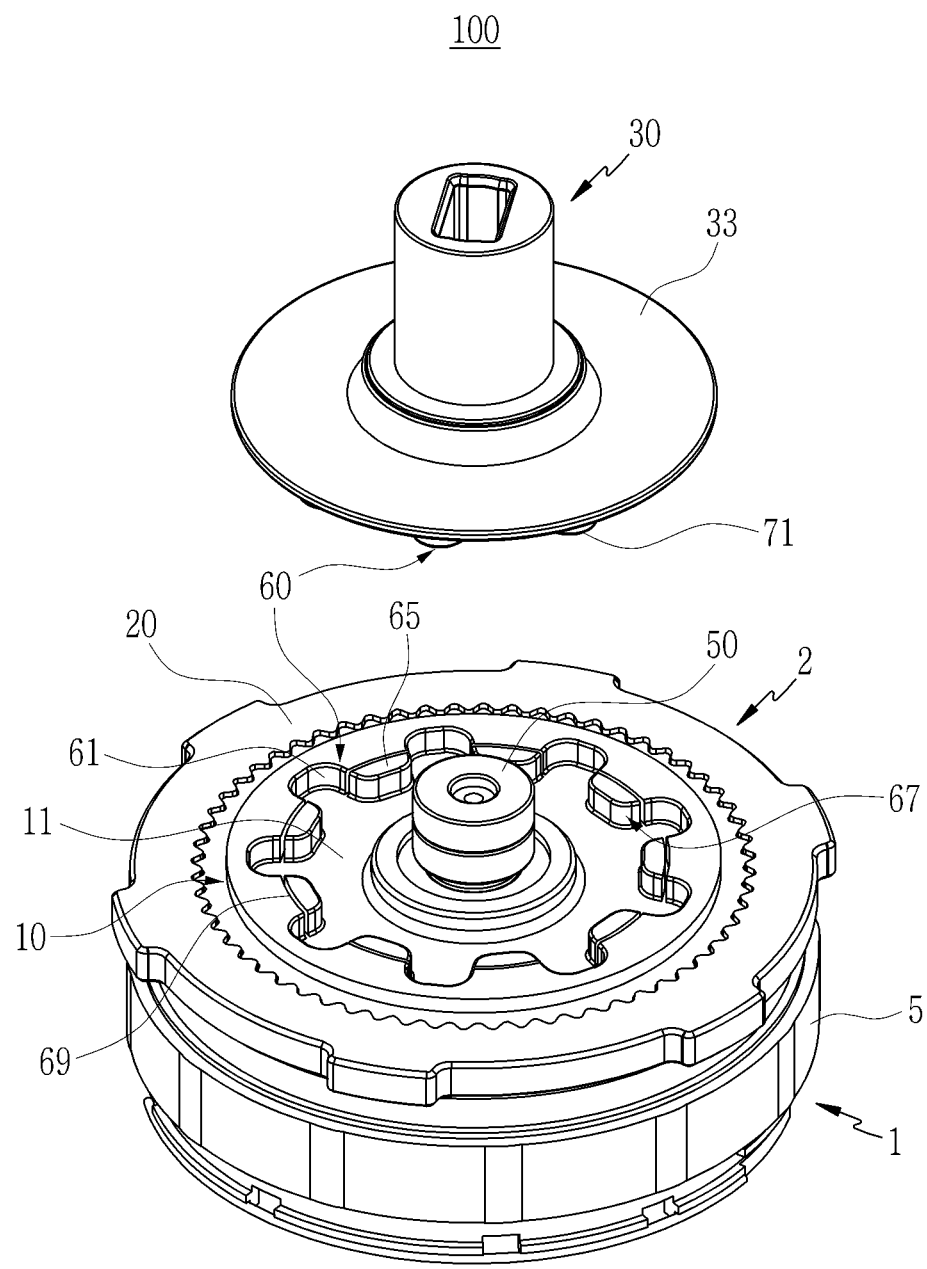
FIG. 3 and FIG. 4 are partially exploded perspective views showing a coupling structure of a drive motor and a decelerator applied to an actuator for a shift-by-wire system according to an exemplary embodiment of the present invention.
Figure 4:
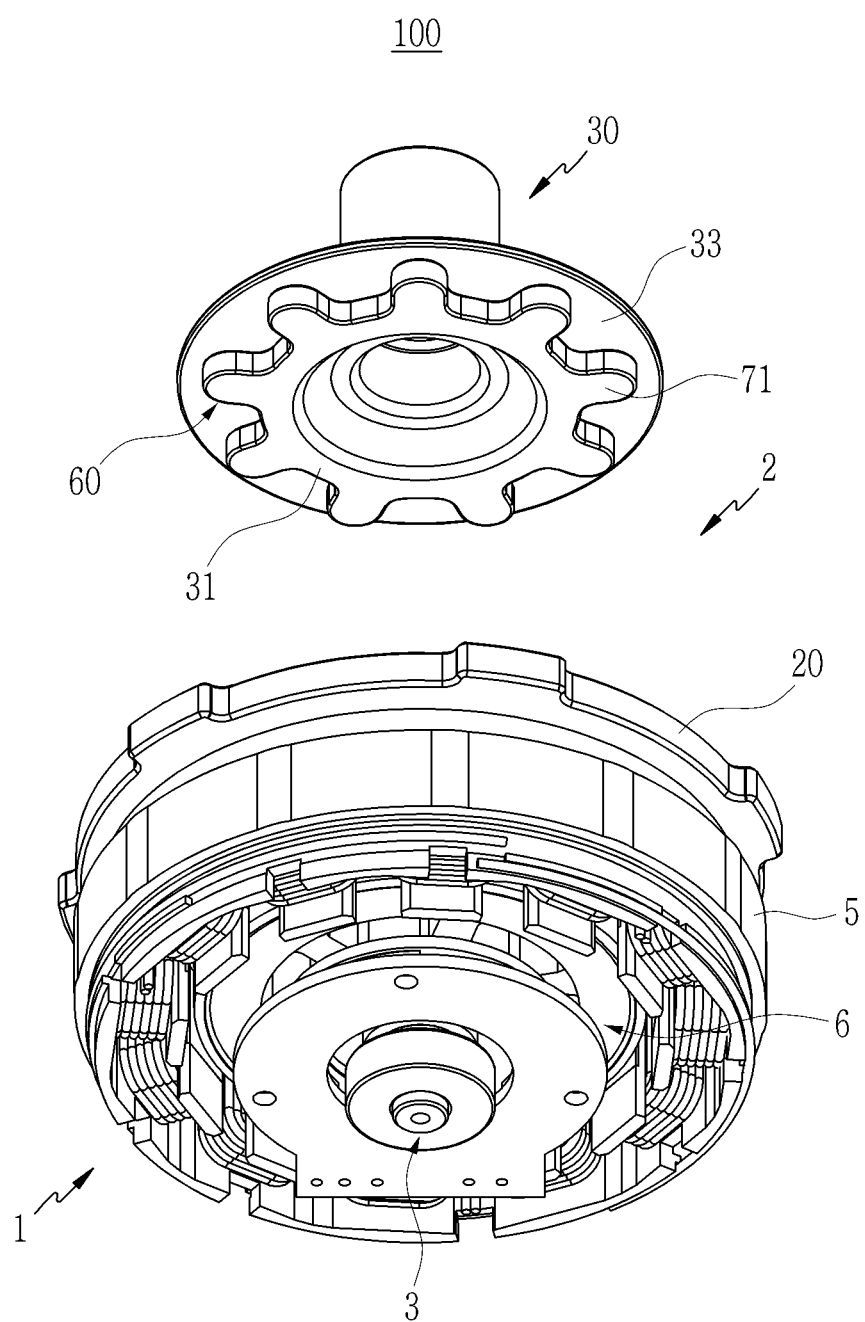
Figure 5:
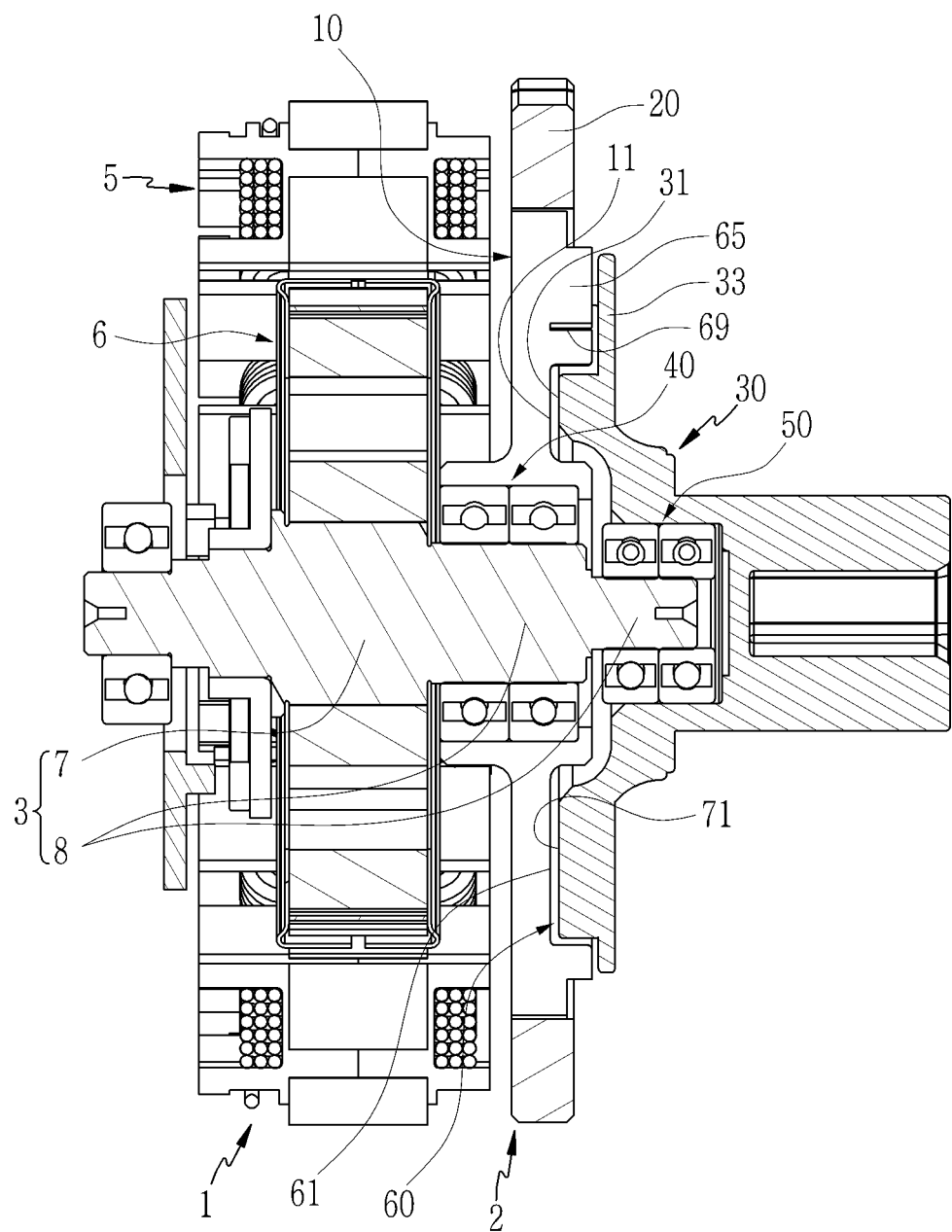
FIG. 5 is a cross-section schematic diagram showing a coupling structure of a drive motor and a decelerator applied to an actuator for a shift-by-wire system according to an exemplary embodiment of the present invention.

FIG. 3 and FIG. 4 are partially exploded perspective views showing a coupling structure of a drive motor and a decelerator applied to an actuator for a shift-by-wire system according to an exemplary embodiment of the present invention, and FIG. 5 is a cross-section schematic diagram showing a coupling structure of a drive motor and a decelerator applied to an actuator for a shift-by-wire system according to an exemplary embodiment of the present invention.

Referring to FIG. 3 to FIG. 5, the power delivery unit 60 according to an exemplary embodiment of the present invention is provided to be mutually coupled to the sun gear 10 and the output shaft 30 in the center region between the first bearing 40 and the second bearing 50 as mentioned above.

Figure 6:
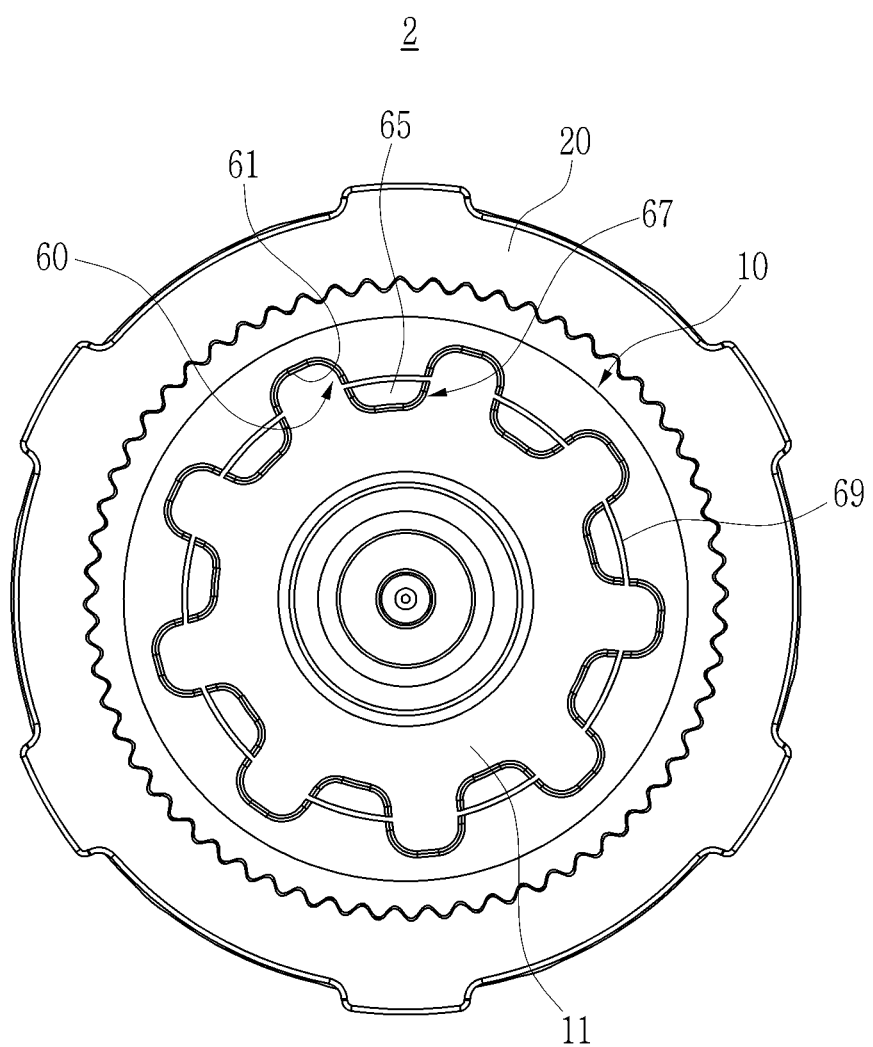
FIG. 6 is a view showing a sun gear part of a decelerator applied to an actuator for a shift-by-wire system according to an exemplary embodiment of the present invention.
Figure 7:
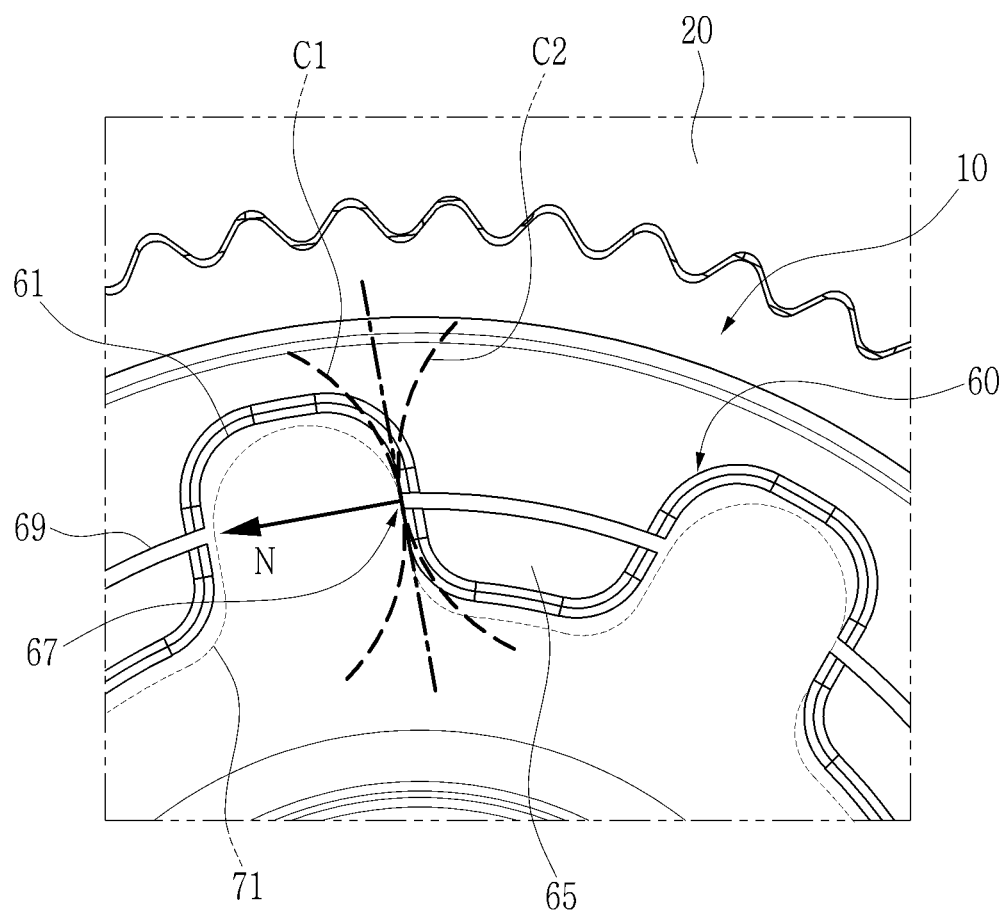
FIG. 7 is a view showing a sun gear and output shaft part of a decelerator applied to an actuator for a shift-by-wire system according to an exemplary embodiment of the present invention.

The power delivery unit 60 includes radial groove parts 61 and crown parts 65 provided on the sun gear 10 as shown in FIG. 6. The power delivery unit 60 also includes radial protrusions 71 provided on the output shaft 30 as shown in FIG. 7.

In an exemplary embodiment of the present invention, the radial groove parts 61 are radially formed along the radial direction on the edge part of the other side surface of the sun gear 10 corresponding to the output shaft 30.

The crown parts 65 are radially formed along the radial direction between the radial groove parts 61 of the sun gear 10. That is, the crown parts 65 are formed to be protruded to the side of the output shaft 30 according to the shaft direction between the radial groove parts 61 of the sun gear 10.

The radial groove parts 61 may have an inner wall connected in a rounded shape, and the inner wall may be connected in a rounded shape with the ends of the crown parts 65. That is, both edges of the crown parts 6 may be connected in a rounded shape with the inner wall of the radial groove parts 61.

In an exemplary embodiment of the present invention, the radial protrusions 71 are formed to be radially protruded along the radial direction at the edge part of the output shaft 30 and coupled to the radial groove parts 61 of the sun gear 10 with a predetermined gap.

In the above, the radial protrusions 71 are coupled to the radial groove parts 61 at a predetermined gap with the inner wall of the radial groove parts 61. The ends of the radial protrusions 71 are formed in a rounded shape.

In addition, grooves are formed between the radial protrusions 71 to engage the crown parts 65, and the grooves are coupled to the radial protrusions 71 at a predetermined gap with the radial protrusions 71.

Here, the gap between the radial groove parts 61 and the radial protrusion 71 and the gap between the groove between the radial protrusions 71 and the crown parts 65 satisfies the eccentricity amount of the sun gear 10 for the drive shaft 3, and the gap distance thereof may vary depending on the eccentricity amount of the sun gear 10.

Also, the radial protrusions 71 are integrally formed to a center side of the flange part 31 of the output shaft 30. The flange part 31 is integrally formed at the center side of the output shaft 30 along the direction perpendicular to the shaft direction. That is, the radial protrusions 71 are formed to be radially protruded along the radial direction at the edge part of the flange part 31.

Furthermore, the output shaft 30 further includes a cover part 33 which is integrally connected with the flange part 31 and the radial protrusions 71. The cover part 33 supports the crown parts 65 of the sun gear 10.

In addition, the sun gear 10 forms a supporting groove part 11 corresponding to the flange part 31 of the output shaft 30 in the above. The supporting groove part 11 as a part supporting the flange part 31 of the output shaft 30 is connected to the radial groove parts 61. The supporting groove part 11 is connected to the center part side of the sun gear 10 from the radial groove parts 61.

On the other hand, in an exemplary embodiment of the present invention, the radial groove parts 61 and the radial protrusions 71 of the power delivery unit 60 are disposed to overlap each other in the center region between the first bearing 40 and the second bearing 50.

In addition, the crown parts 65 of the sun gear 10 in the power delivery unit 60 form an arc surface 67 of a predetermined curvature at the portion of the radial groove parts 61 in contact with the radial protrusion 71.

Accordingly, the radial protrusions 71 are in contact with the arc surface 67 in a normal direction along the rotational direction of the output shaft 30. That is, the radial groove parts 61 and the radial protrusions 71 are provided to be in contact in the normal direction according to the rotating direction of the output shaft 30.

If the coupling structure of the radial groove parts 61 and the radial protrusions 71 as above-described is described in detail with reference to FIG. 6 and FIG. 7, the radial groove parts 61 form a first circular arc C1 (an imaginary line) of a predetermined curvature extending from the inner wall to the end side of the crown parts 65. Also, the crown parts 65 form a second circular arc C2 (an imaginary line) of a predetermined curvature from the end side toward the edge end side of the sun gear 10.

Here, the crown part 65 forms an arc surface 67 as mentioned above at the portion where the first arc C1 and the second arc C2 meet each other. In addition, the radial protrusion 71 is in contact with the arc surface 67 in the normal direction N along the rotational direction of the output shaft 30.

Accordingly, the radial groove parts 61 and the radial protrusions 71 may transmit the rotation torque of the normal direction N to the output shaft 30 through the sun gear 10 in the center range between the first bearing 40 and the second bearing 50.

Figure 8:
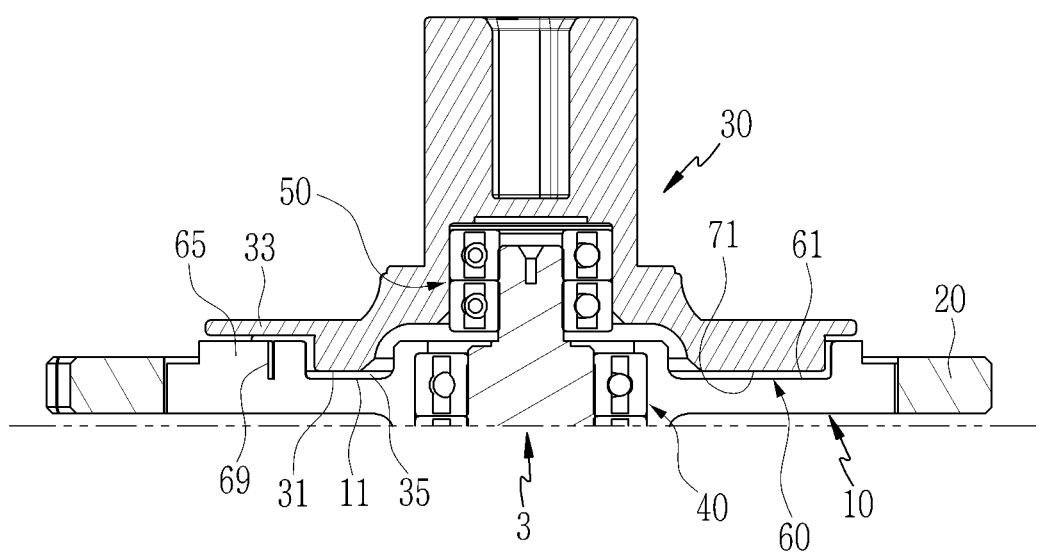
FIG. 8 is a view showing a lubricant filled part of a decelerator applied to an actuator for a shift-by-wire system applied to an exemplary embodiment of the present invention.

On the other hand, referring to FIG. 8 along with FIG. 3 and FIG. 4, in an exemplary embodiment of the present invention, a lubricant filled part 35 filled with a lubricant (for example, grease) is provided between the flange part 31 of the output shaft 30 and the supporting groove part 11 of the sun gear 10.

The lubricant filled part 35 is a portion filled with a lubricant between the flange part 31 and the supporting groove part 11, which are mutually coupled, and the lubricant has a function of reducing friction and wear with the output shaft 30 according to a phase movement of the sun gear 10.

Here, the lubricant may be filled in a closed and sealed state at the lubricant filled part 35 between the flange part 31 and the supporting groove part 11. Such a lubricant maintains a semi-solid state having a high viscosity in the lubricant filling part 35 before the phase movement of the sun gear 10, and when the sun gear 10 is in a forward/reverse phase difference movement, it is changed into a low viscosity state with fluidity. Furthermore, the lubricant may circulate through the crown parts 65 in the lubricant filled part 35 during the forward/reverse phase difference movement of the sun gear 10.

To this end, in the exemplary embodiment of the present invention, a lubricant flow groove 69 connected to the lubricant filling part 35 is formed in the crown parts 65.

The lubricant flow groove 69 is formed on the upper surface (based on the drawing) of the crown parts 65 along the rotational direction of the sun gear 10. The lubricant flow groove 69 may be closed and sealed through the cover part 33 of the output shaft 30 supporting the crown parts 65 as mentioned above.

Hereinafter, the operation and effect of the actuator 100 for the shift-by-wire system according to an exemplary embodiment of the present invention configured as described above are described in detail with reference to the above-disclosed drawings and the accompanying drawings.

First, in an exemplary embodiment of the present invention, if the shift range conversion signal is input to the controller through the operation of the shift lever, the controller applies the drive signal to the drive motor 1. Accordingly, the drive motor 1 rotates the drive shaft 3 in one side direction.

Then, the sun gear 10 rotates eccentrically inside the ring gear 20 through the eccentric part 8 of the drive shaft 3. At this time, the sun gear 10 is engaged with the internal teeth of the ring gear 20 through the external teeth, and orbits inside the ring gear 20 while rotating in the direction opposite to the rotation direction of the drive shaft 3 along the internal teeth of the ring gear 20.

Accordingly, the sun gear 10 transmits the torque decelerated by the cycloid deceleration movement to the output shaft 30 through the power delivery unit 60.

When the power delivery process through the power delivery unit 60 is described in detail, first, in an exemplary embodiment of the present invention, the radial protrusions 71 of the output shaft 30 are in the state where the radial protrusions 71 of the output shaft 30 are mutually coupled to the radial groove parts 61 of the sun gear 10 in the center region between the first and second bearings 40 and 50.

In this state, when the sun gear 10 rotates, the radial protrusions 71 are in close contact with the arc surface 67 of the crown parts 65 along the power delivery direction in the radial groove parts 61. At this time, the radial protrusions 71 are in contact with the arc surface 67 in the normal direction N along the power delivery direction.

Therefore, in an exemplary embodiment of the present invention, the radial protrusions 71 are in contact with the arc surface 67 of the crown parts 65 in the radial groove parts 61 along the rotation direction of the sun gear 10 in the normal direction N, thereby transmitting the torque of the sun gear 10 to the output shaft 30.

In an exemplary embodiment of the present invention, the radial protrusions 71 are in contact with the arc surface 67 of the crown parts 65 in the radial groove parts 61, thereby transmitting the rotation torque of the normal direction N to the output shaft 30.

Here, the contact areas of the radial protrusions 71 with respect to the crown parts 65 are uniform. Accordingly, in an exemplary embodiment of the present invention, the slip between the sun gear 10 and the output shaft 30 may be reduced by maintaining a constant surface pressure between the crown parts 65 and the radial protrusions 71.

In addition, in an exemplary embodiment of the present invention, as the flange part 31 of the output shaft 30 is supported through the supporting groove part 11 of the sun gear 10, the slip between the sun gear 10 and the output shaft 30 may be reduced by increasing the contact area of the sun gear 10 and the output shaft 30.

Accordingly, in an exemplary embodiment of the present invention, the slip between the sun gear 10 and the output shaft 30 may be reduced, thereby preventing the mutual wear of the sun gear 10 and the output shaft 30 and the deformation of the sun gear 10 and the output shaft 30 depending on the wear.

Furthermore, in an exemplary embodiment of the present invention, the lubricant filling part 35 between the flange part 31 and the supporting groove part 11 is filled with lubricant, and the lubricant flow groove 69 of the crown part 65 connected to the lubricant filling part 35 is closed and sealed through the cover part 33 of the output shaft 30.

Thus, in an exemplary embodiment of the present invention, during the phase movement of the sun gear 10, the lubricant filled in the lubricant filling part 35 is circulated through the lubricant flow groove 69, and the friction and the wear with the sun gear 10 and the output shaft 30 may be reduced by the lubrication action of the lubricant.

Also, in an exemplary embodiment of the present invention, as the lubricant flow groove 69 is closed and sealed through the cover part 33 of the output shaft 30, foreign substances may be prevented from entering the lubrication region of the lubricant.

Figure 9:
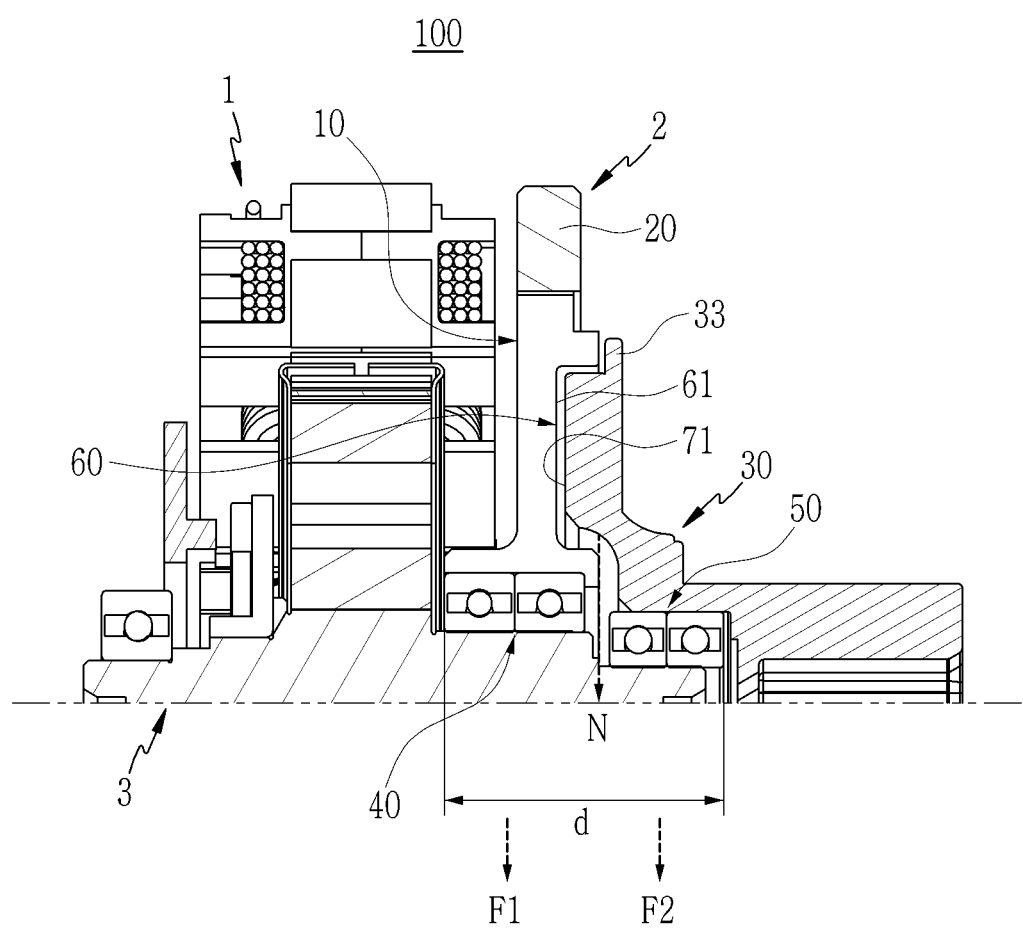
FIG. 9 is a view to explain an operation effect of an actuator for a shift-by-wire system according to an exemplary embodiment of the present invention.

On the other hand, in an exemplary embodiment of the present invention, as shown in FIG. 9, in the section d between the first bearing 40 and the second bearing 50, the radial groove parts 61 of the sun gear 10 and the radial protrusions 71 of the output shaft 30 are disposed to be mutually overlapped in the center region between the first and second bearings 40 and 50 thereof, and total contact force during the deceleration may be reduced.

Also, in an exemplary embodiment of the present invention, as the rotation torque of the normal direction N is transmitted to the output shaft 30 in the center region between the first bearing 40 and the second bearing 50, the load of the normal direction N may be minimized from being concentrated to one side bearing.

Therefore, in an exemplary embodiment of the present invention, the radial direction loads F1 and F2 acting on the first and second bearings 40 and 50 are evenly distributed, and the occurrence of complex loads for the first and second bearings 40 and 50 may be minimized.

Accordingly, in an exemplary embodiment of the present invention, the fatigue life of the first and second bearings 40 and 50 may be increased, and the delivery efficiency of the output torque for the output shaft 30 may be further improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An actuator for a shift-by-wire system comprising:
 a drive motor installed inside a motor housing, the drive motor having a drive shaft; and
 a decelerator inside a decelerator housing coupled with the motor housing, the decelerator eccentrically coupled to the drive shaft, the decelerator including:

a sun gear rotatably connected to a first side of an eccentric part of the drive shaft;

a ring gear engaged with the sun gear and fixed to the decelerator housing;

an output shaft rotatably connected to a second side of the eccentric part, wherein the output shaft integrally forms a flange part orthogonal to a shaft direction;

a first bearing coupled to one side of the eccentric part and supporting the sun gear;

a second bearing coupled to another side of the eccentric part and supporting the output shaft; and a power delivery unit coupled to the sun gear and the output shaft in a center region between the first bearing and the second bearing, wherein the power delivery unit includes radial groove parts radially formed along a radial direction at an edge part of one surface of the sun gear corresponding to the output shaft and radial protrusions formed to be protruded along a radial direction at an edge part of the flange part of the output shaft and coupled to the radial groove parts with a predetermined gap and wherein the sun gear further includes a supporting part connected to the radial groove parts and supporting the flange part of the output shaft.

2. The actuator for the shift-by-wire system of claim 1, wherein the radial groove parts and radial protrusions are disposed to be mutually overlapped in the center region between the first bearing and the second bearing.

3. The actuator for the shift-by-wire system of claim 1, wherein the power delivery unit further includes crown parts formed radially along a radial direction between the radial groove parts of the sun gear.

4. The actuator for the shift-by-wire system of claim 3, wherein the crown parts form an arc surface of a predetermined curvature at a part in contact with the radial protrusion in the radial groove.

5. The actuator for the shift-by-wire system of claim 4, wherein the radial protrusion is in contact in a normal direction to the arc surface along a rotating direction of the output shaft.

6. The actuator for the shift-by-wire system of claim 5, wherein the radial groove and the radial protrusion are configured to transmit a rotation torque of a normal direction to the output shaft through the sun gear in the center region between the first bearing and the second bearing.

7. The actuator for the shift-by-wire system of claim 1, wherein a lubricant filled part filled with a lubricant is provided between the flange part and the supporting part.

8. The actuator for the shift-by-wire system of claim 7, wherein:

the sun gear includes crown parts formed between the radial groove parts; and a lubricant flow groove connected with the lubricant filled part is formed in the crown parts.

9. The actuator for the shift-by-wire system of claim 1, wherein the output shaft further includes a cover part integrally connected with the flange part and the radial protrusion.

10. An actuator for a shift-by-wire system comprising:

a drive motor installed inside a motor housing, the drive motor having a drive shaft; and a decelerator inside a decelerator housing coupled with the motor housing, the decelerator eccentrically coupled to the drive shaft, the decelerator including:

a sun gear rotatably connected to a first side of an eccentric part of the drive shaft;

a ring gear engaged with the sun gear and fixed to the decelerator housing;

an output shaft rotatably connected to a second side of the eccentric part, wherein the output shaft integrally forms a flange part orthogonal to a shaft direction; and radial groove parts radially formed along a radial direction at an edge part of one side surface of the sun gear corresponding to the output shaft and radial protrusions formed to be protruded along a radial direction at an edge part of the output shaft and coupled to the radial groove parts with a predetermined gap and wherein the sun gear further includes a supporting part connected to the radial groove parts and supporting the flange part of the output shaft.

11. The actuator for the shift-by-wire system of claim 10, wherein the radial groove parts and the radial protrusions are provided to be in contact along a rotating direction of the output shaft in a normal direction.

12. The actuator for the shift-by-wire system of claim 10, wherein the sun gear further includes crown parts radially formed along a radial direction between the radial groove parts of the sun gear.

13. The actuator for the shift-by-wire system of claim 12, wherein:

the radial groove forms a first circular arc of a first predetermined curvature extending from an inner wall to an end side of the crown parts; and the crown parts form a second circular arc of a second predetermined curvature from the end side toward an edge end side of the sun gear.

14. The actuator for the shift-by-wire system of claim 13, wherein:

the crown parts form an arc surface in which the first circular arc and the second circular arc meet each other; and the radial protrusion is in contact with the arc surface in a normal direction along the rotating direction of the output shaft.

15. The actuator for the shift-by-wire system of claim 10, further comprising a bearing coupled to one side of the eccentric part and supporting the sun gear.

16. The actuator for the shift-by-wire system of claim 10, further comprising a bearing coupled to one side of the eccentric part and supporting the output shaft.

17. The actuator for the shift-by-wire system of claim 10, further comprising a first bearing coupled to one side of the eccentric part and supporting the sun gear and a second bearing coupled to another side of the eccentric part and supporting the output shaft.

18. An actuator for a shift-by-wire system comprising:

a drive motor installed inside a motor housing, the drive motor having a drive shaft; and a decelerator inside a decelerator housing coupled with the motor housing, the decelerator eccentrically coupled to the drive shaft, the decelerator including:

a sun gear rotatably connected to a first side of an eccentric part of the drive shaft;

a ring gear engaged with the sun gear and fixed to the decelerator housing;

an output shaft rotatably connected to a second side of the eccentric part; and radial groove parts radially formed along a radial direction at an edge part of one side surface of the sun gear corresponding to the output shaft and radial protrusions formed to be protruded along a radial direction at an edge part of the output shaft and coupled to the radial groove parts with a predetermined gap;

wherein the sun gear further includes crown parts radially formed along a radial direction between the radial groove parts of the sun gear;

wherein the radial groove forms a first circular arc of a first predetermined curvature extending from an inner wall to an end side of the crown parts; and wherein the crown parts form a second circular arc of a second predetermined curvature from the end side toward an edge end side of the sun gear.

19. The actuator for the shift-by-wire system of claim 18, wherein the radial groove parts and the radial protrusions are provided to be in contact along a rotating direction of the output shaft in a normal direction.

20. The actuator for the shift-by-wire system of claim 18, wherein:

the crown parts form an arc surface in which the first circular arc and the second circular arc meet each other; and the radial protrusion is in contact with the arc surface in a normal direction along the rotating direction of the output shaft.

* * * * *